UNITED STATES PATENT OFFICE.

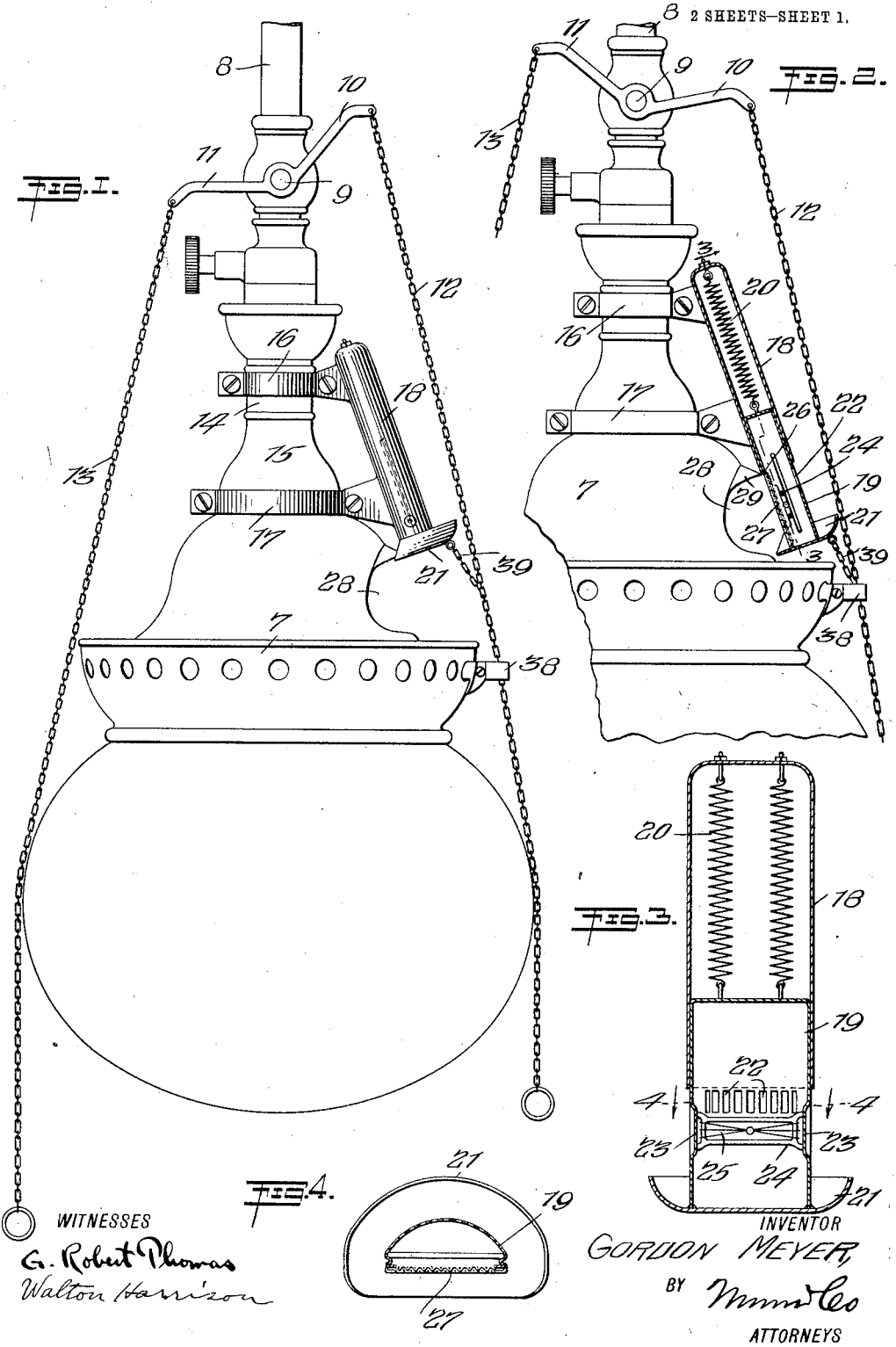

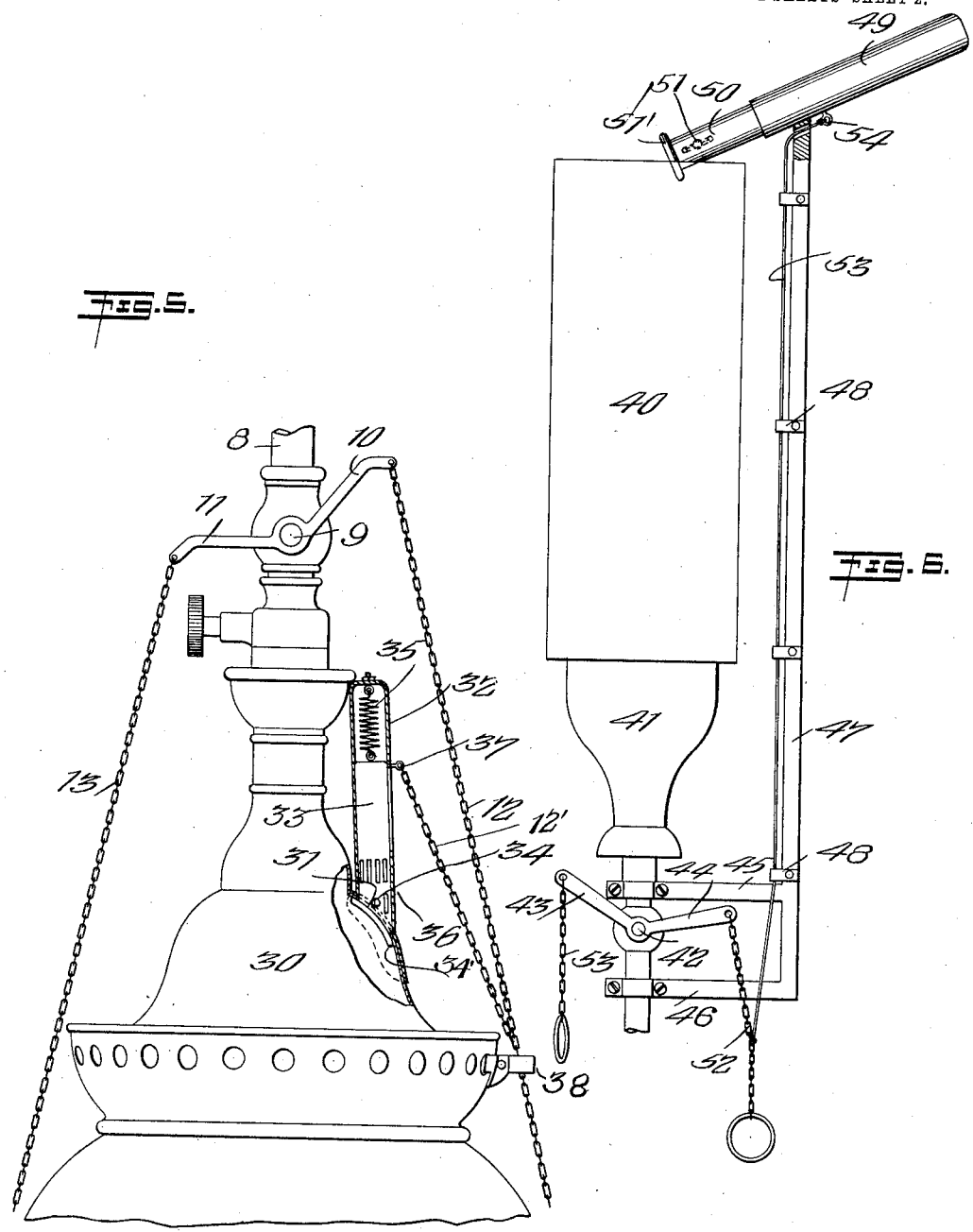

GORDON MEYER, OF SAUGERTIES, NEW YORK.

GAS-LIGHTER.

1,100,600. Specification of Letters Patent. Patented June 16, 1914.

Application filed September 3, 1913. Serial No. 787,885.

*To all whom it may concern:*

Be it known that I, GORDON MEYER, a citizen of the United States, and a resident of Saugerties, in the county of Ulster and State of New York, have made certain new and useful Improvements in Gas-Lighters, of which the following is a specification.

My invention relates to gas lighters, and particularly to gas lighters of the catalytic type in which ignition is set up by aid of a catalytic material against or through which the gas impinges. More particularly stated, I seek to produce a lighter of this type in which the catalytic material or member is protected to a great extent so as to prolong its period of utility. I have made the discovery that catalytic material, when not in immediate use for purposes of ignition, may be kept in good condition for a long time if the material or member in question be properly housed, so as to exclude action upon it of air and heat. What I seek to do, therefore, generally speaking, is to house the catalytic member until the instant it is to be used, and then to expose the catalytic member during as short a period as possible, after which it is again housed. I find moreover, that by doing this the efficiency of the catalytic member is greatly increased. Following this idea, I have produced a self-closing, practically air tight and substantially heat-proof receptacle which I mount upon a gas lamp and which is equipped with means for holding the catalytic substance such as platinum black, palladium black, metallic platinum or analogous metal in the form of fine wire, or other equivalent catalytic lighting member. This member is thus protected from the action of heat, moisture and various climatic conditions such as would tend otherwise to cause deterioration of the catalytic member.

The invention may be applied to gas burners of various kinds already in use, or may be incorporated in any gas burner of a new type.

Reference is made to the accompanying drawings forming a part of this specification, and in which like letters indicate like parts.

Figure 1 is a side elevation of a so-called "inverted" gas lamp equipped with my invention, the latter being now idle. Fig. 2 is a fragmentary elevation of the lamp shown in Fig. 1, the lighter being shown in section, and appearing as in use. Fig. 3 is a detail of the lighter, being a section on the line 3—3 of Fig. 2, looking in the direction of the arrow. Fig. 4 is a section on the line 4—4 of Fig. 3, looking in the direction of the arrow. Fig. 5 is a side elevation partly in section showing my lighter as applied to an inverted gas lamp, and forms part of the complete burner or lamp. Fig. 6 is a side view partly in elevation and partly in section, showing my improved lighter as applied to a lamp having an incandescent mantle.

The body of the lamp is shown at 7, the gas pipe at 8, the gas valve at 9, the arms for actuating this gas valve at 10 and 11, and the chains for actuating these arms at 12 and 13. The lamp is provided with a neck 14 having an enlarged portion 15. Fitting upon the neck are two collars 16—17, which carry a casing 18, the bottom end of which is open. Slidably mounted within the casing 18 is a drawer 19. This drawer is connected by springs 20 with the upper end of the casing, as will be understood from Fig. 3. The lower end of the drawer 19 carries a shield 21. The drawer 19 is provided with a number of holes 22, forming practically a window having the general shape of a grid. The drawer 19 is provided with two oppositely disposed portions 23 which are stamped inwardly. A spider 24, or metallic frame, is detachably secured between the portions 23 which hold the spider in position by pressure against its ends. The spider carries a catalytic member 25 which in this instance is shown as a number of microscopic wires made of platinum or palladium. A platinum sponge or any other form of catalytic member may be secured upon the spider 24 in any desired manner and may be used in place of the wires 25. The drawer 19 is provided with an opening 26, the latter being covered by a gauze window 27, the meshes of which are sufficiently open to allow ignition to take place through them. The gauze window may be omitted, if desired, so as to leave the opening 26 unobstructed.

In the form shown in Fig. 5, the gas lamp appears at 30 and is provided with an opening 31. The casing of the lighter is shown at 32 and the drawer of the lighter at 33. The lower end of the drawer carries a catalytic member which appears at 34, and also a plug or cap 34' of heat resisting material for closing opening 31 to prevent heat from entering the drawer 33. The spring 35 within the casing 32 connects the drawer 33 with the upper end of the casing. The casing is provided with a grid 36—that is, with a number of holes arranged so as to practically constitute a grid. An eye 37 is mounted upon the drawer 33 and is connected to a chain 12', this chain being connected to the chain 12. In Figs. 1, 2 and 5 the chain 12 extends through a guide 38. In Figs. 1 and 2 I employ a chain 39 which is somewhat shorter than the chain 34 to connect the shield 21 and lower end of the drawer 19 with the chain 12.

In the form shown in Fig. 6, a chimney is shown at 40, the burner at 41 and the gas valve at 42. The arms 43—44 are used for operating the gas cock or valve. Mounted upon the burner are bracket arms 45—46 which support a mast 47. Mounted upon this mast are guides 48. Supported upon the top of the mast is the lighter casing 49 and fitted telescopically into the lighter casing is the drawer 50 carrying a catalytic member 51, and also a heat resisting cap or plug 51'. In other respects the casing 49 is similar to the casing 18 above described. The pull chains are shown at 52 and 53 and are connected to the arms 44—43. Connected to the pull chain 52 is a wire or cable 53, which extends through the guides 48 and is connected to an eye 54 carried by the drawer 50.

The operation of the various forms of my invention are substantially alike. Whenever the pull chain 12 or 52 is drawn downwardly for the purpose of turning on and lighting the gas, the drawer of the casing is pulled downwardly, the spring within the casing stretching to an extent sufficient to permit this result. The gas now comes into contact with the catalytic member, and is ignited. Whenever the pull chain 12 or 52 is released, the drawer carrying the catalytic member is restored to its normal position under the action of spring 32. The shield 21, when in its uppermost position, prevents the heat of the lamp from affecting the catalytic substance.

I do not limit myself to the precise arrangement shown, as variations may be made therein without departing from the spirit of my invention.

I claim:—

1. In a lighting device, the combination with a lamp, and a valve for supplying gas thereto, of a casing, a drawer slidably mounted therein and adapted to be completely housed within said casing, means for supporting a catalytic lighting member within said drawer, means controllable at the will of the operator for simultaneously operating the valve and drawing said drawer out in order to place said catalytic member in position to be effective, and means for retracting said drawer relatively to said casing.

2. In a lighting device, the combination of a lamp provided with an opening, a casing mounted upon said lamp and provided with an opening adjacent to said opening in said lamp, a drawer slidably mounted within said casing and provided with an opening adapted to move into close proximity to said opening in said lamp, means carried by said drawer for supporting a catalytic member therein, and mechanism controllable at the will of the operator for sliding said drawer relatively to said casing.

3. In a lighting device, the combination of a casing, means for detachably mounting the same upon a lamp to be lighted, a drawer slidably mounted within said casing and adapted to be completely housed therein, said drawer having an enlargement at its end, means carried by said drawer for supporting a catalytic substance, a spring located within said casing and connected to said casing and to said member for the purpose of normally holding said member within said casing, and mechanism connected with said member and controllable at the will of the operator for withdrawing said member partially out of said casing.

4. A device of the character described comprising a lamp provided with an opening through which said lamp may be lighted, a casing mounted upon said lamp, a drawer slidably mounted within said casing and provided with a gauze window covering said opening, means for supporting a catalytic substance within said drawer in such position that such catalytic substance may be moved into proximity to said opening in said lamp, and means for sliding said drawer relatively to said casing.

5. As an article of manufacture, a catalytic member comprising a casing, means for mounting the same upon a lamp, a drawer slidably mounted within said casing, a shield carried by said drawer, and means for supporting a catalytic substance within said drawer.

6. A device of the character described, comprising a casing, a tubular member in the casing and having an opening in its side and provided with a shield at its lower end, a spring secured to the upper part of the casing and to the tubular member, and means for supporting a catalytic substance in the tubular member.

7. In a device of the character described, the combination with a lamp, and a valve for supplying gas thereto, of a casing secured to the lamp, a drawer slidably mounted in said casing, means for supporting a catalytic substance within said drawer, means tending to return said drawer to a position within said casing when moved therefrom, and means connected with said drawer operated simultaneously with the operation of the valve whereby the catalytic substance will be placed in an operative position simultaneously with the turning on of the gas.

GORDON MEYER.

Witnesses:
　THOMAS F. WALSH,
　STUART B. MAXWELL.

Copies of this patent may be obtained for five cents each, by addressing the "Commissioner of Patents, Washington, D. C."